United States Patent [19]

Freyman

[11] Patent Number: 4,770,429

[45] Date of Patent: Sep. 13, 1988

[54] BABY CARRIAGE CAPABLE OF CLIMBING STAIRS

[76] Inventor: Alexander Freyman, 1903 Ocean Ave., Apt. #B-8, Brooklyn, N.Y. 11230

[21] Appl. No.: 41,783

[22] Filed: Apr. 23, 1987

[51] Int. Cl.4 .............................................. B62B 9/02
[52] U.S. Cl. ................................................ 280/5.28
[58] Field of Search ................... 280/5.2, 5.3, 5.32, 280/5.28, 47.38, 47.41; 180/8.1, 8.2, 8.3

[56] References Cited

U.S. PATENT DOCUMENTS

| | | | |
|---|---|---|---|
| 1,215,771 | 2/1917 | Brown | 280/5.32 X |
| 1,890,469 | 12/1932 | Powers | 280/5.28 |
| 2,626,162 | 1/1953 | Erwin | 280/5.28 |
| 2,639,925 | 5/1953 | Miklos | 280/5.28 |
| 2,770,464 | 11/1956 | Mittendrein et al. | 280/5.28 |

FOREIGN PATENT DOCUMENTS

| | | | |
|---|---|---|---|
| 579076 | 7/1958 | Italy | 280/5.28 |
| 734048 | 7/1955 | United Kingdom | 280/5.28 |

*Primary Examiner*—John J. Love
*Assistant Examiner*—Mitchell J. Hill

[57] ABSTRACT

A baby carriage capable of climbing stairs utilizes a tubular frame with rear legs pivotably connected to and a basket tiltably positioned on said frame.

The basket in its position is secured by a pair of pins inserted in slots in a plate fixedly positioned on the frame.

When operated on a flat surface the pivoting movement of the rear legs is checked by locking latches mounted on the frame, these latches, when necessary, can be desengaged by the operator.

3 Claims, 3 Drawing Sheets

BABY CARRIAGE CAPABLE OF CLIMBING STAIRS

BACKGROUND OF THE INVENTION

The invention relates to construction of baby carriages and, in particular, to a baby carriage capable of climbing stairs.

Regularly the task of moving a baby carriage up- or downstairs requires efforts of two people as the existing baby carriages are not made for this purpose.

Meanwhile, the necessity of creating carriages of this kind is quite obvious as not all the buildings are equipped with elevators, and the process of moving up- or downstairs carriages of existing constructions is extremely inconvenient and, all the more, not safe.

SUMMARY OF THE INVENTION

The primary object of the present invention is a provision of a wheeled, manually propelled baby carriage, simple in construction and inexpensive in manufacturing, which, being pushed by the user, is capable of climbing stairs.

Another object of the invention is a provision of a baby carriage which as being pushed by the user up- or downstairs, can be tilted in the desired direction and at the desired angle, so that the baby can conveniently and safely stay in the carriage.

Still another object of the invention is a provision of a baby carriage, which, while being operated on a flat surface would represent a sturdy construction, safe and reliable in operation.

The above objects of the present invention are attained by constructing a baby carriage furnished with a tilting mechanism, the rear legs of said carriage carrying wheels are pivotably attached to the frame, their ability to pivot makes the carriage, while being pushed by the operator, capable of climbing stairs.

For the purpose of convenience and safety, the basket of the carriage can be tilted forward or backward, depending whether the carriage is moving up- or downstairs, respectively, so that the slant of the staircase is to a considerable degree compensated by the tilt of the basket and the latter can retain its horizontal, or close to horizontal position.

The tilt of the basket is created by the upward or downward movement of the handle of the carriage, which is steadily secured to the basket, said basket can be rotated at a required angle around the pivots, positioned on the frame of the carriage.

The basket can be secured in its tilted or horizontal position by a pair of supporting plates with slots, fixedly positioned on the frame on each side of the basket, and a pair of lock pins projecting into said slots, these lock pins are integral with a supporting transverse rod on which the rear portion of the basket rests.

The work of the lock pins is controlled by a controlling bar, conveniently positioned at a suitable distance within the U-shaped handle of the carriage and connected to said pins by means of wires, passing inside the tubular side elements of the handle.

While operating on a flat surface, the pivoting movement of the rear legs of the carriage is prevented by arresting mechanisms, positioned on the frame of the carriage and operated by means of a pedal, conveniently located near the rear wheels so that it can be easily reached by the operator's foot.

Thus, on a flat surface, with its rear legs immovably secured by arresting mechanisms, the carriage represents a sturdy, stable and reliable construction.

In greater detail the invention will now be described and illustrated by the attached drawings in which.

DETAILED DESCRIPTION OF THE INVENTION

Figure 1:
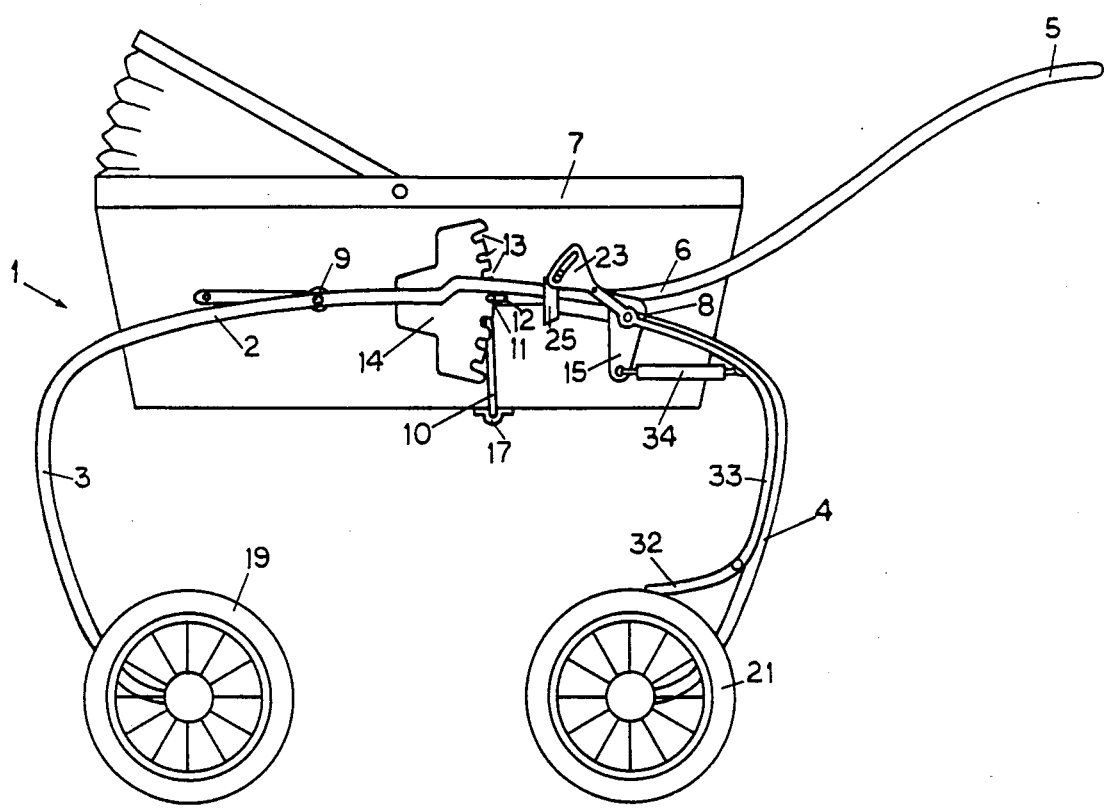
FIG. 1 is a side elevational view of a baby carriage constructed in accordance with the present invention.

The baby carriage as shown in FIG. 1 comprises a tubular frame 1 which includes basically two side members 2 with their front ends extending downwardly to form a pair of stable front legs 3 carrying wheels 19. These side members are spaced apart and secured at a suitable distance from each other.

At the rear end of each side member 2 there is affixed a bracket 15 to which a top portion of a rear leg 4 is rotatably attached on pivot 8. A return mechanism 34 is mounted on each bracket 15 with one end, the other end of each said mechanism is secured on an upper portion of a pivotable rear leg 4 carrying wheel 21.

Figure 3:
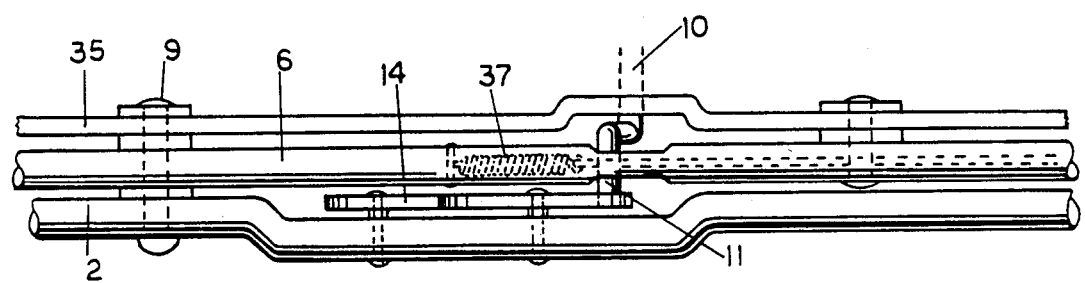
FIG. 3 is an enlarged top elevational view of the tilting mechanism.

A U-shaped tubular handle 5 by means of which the carriage may be manually propelled extends into two side elements 6 holding basket 7 from both sides; these side elements are riveted or otherwise fixedly attached to said basket as can be seen on FIG. 3. Basket 7 together with side elements 6 is pivotably positioned between side members 2 of the frame.

The front portion of basket 7 rests upon a pair of pivots 9, said pivots go through side members 2, side elements 6 and walls 35 of the basket, as shown in FIG. 3. The rear portion of the basket rests on a pair of pivots 49.

Figure 2:
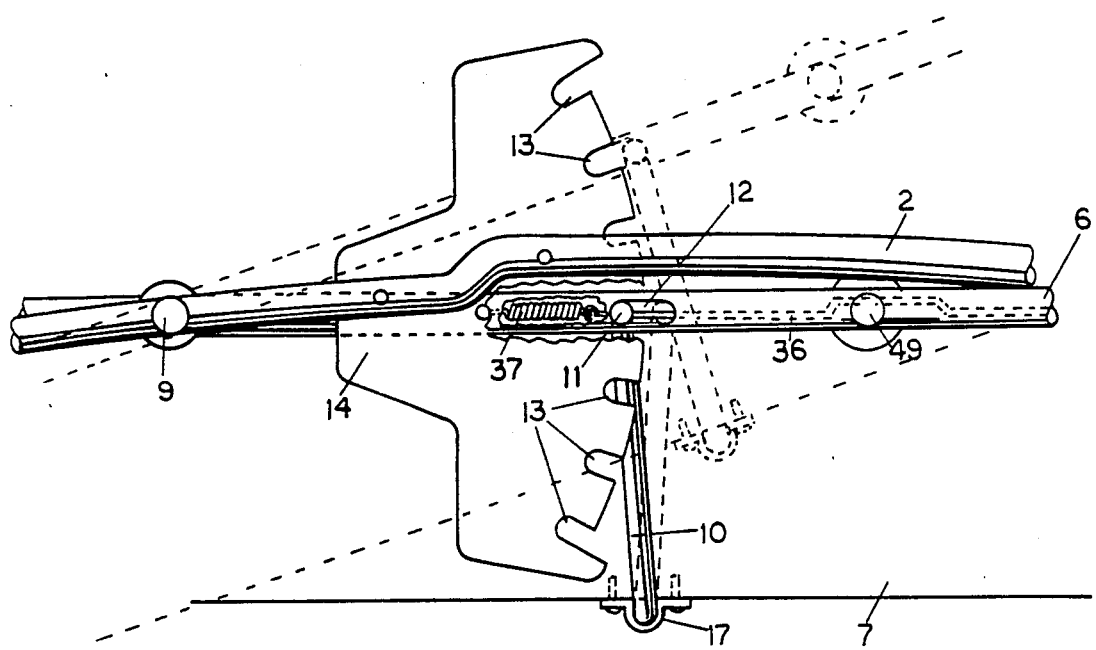
FIG. 2 is an enlarged side elevational view of the tilting mechanism showing the position of the parts when the basket is horizontal (solid lines) and tilted forward (dotted lines).

The rear portion of basket 7 also rests on a U-shaped supporting rod 10 which extends horizontally and transversely beneath the bottom of said basket, its ends bent outwardly to form a pair of lock pins 11 which extend through oblong holes 12 in side elements 6 and further outward into slots 13 positioned along the outer edges of supporting plates 14 (FIGS. 2 and 3).

Plates 14 have a shape of a crescent and are riveted, welded, or otherwise fixedly attached to each of side members 2 at a suitable distance from pivots 9.

Supporting rod 10 is pivotably secured to the bottom of basket 7 from underneath by hinges 17, and its outer ends forming lock pins 11 can move forth and back within oblong holes 12 of side elements 6 (FIGS. 2 and 3). In their backward position (dotted lines in FIG. 2) they are disengaged from slots 13 of supporting plate 14 and basket 7 is free to tilt around pivot 9 at a required angle. If the lock pins 11 are pulled forward (solid lines in FIG. 2), they engage into slots 13 of plates 14 and the basket is now secured in a desired position.

Figure 4:
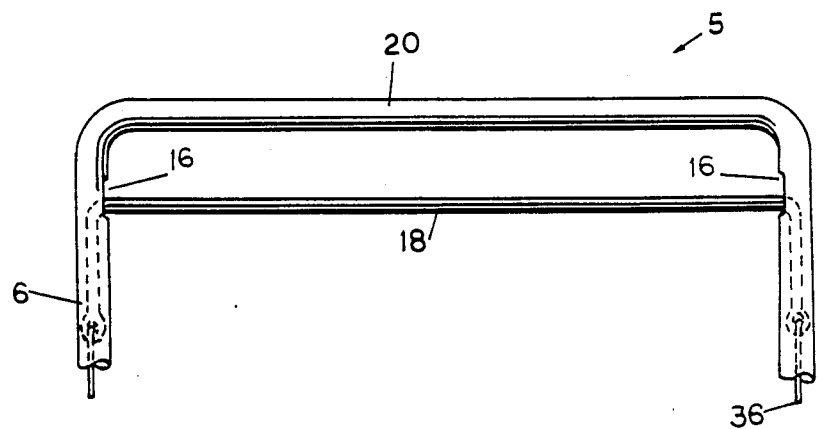
FIG. 4 is an enlarged detailed top elevational view of the handle together with the controlling bar.

Controlling bar 18, as can be seen in FIG. 4, represents a U-shaped rod, located within U-shaped handle 5, its ends inserted through oblong holes 16 in said handle and connected to lock pins 11 by means of wires 36 passing inside tubular side elements 6, as can be seen in FIG. 4.

Controlling bar 18 is conveniently positioned near handle bar 20 so that it can be easily reached by the operator's fingers and moved towards said handle bar, thus, through the means of wires 36 disengaging lock pins 11 from slots 13 of supporting plates 14.

The reverse movement of controlling bar 18 is provided by means of springs 37 engaged with wires 36 and secured inside tubular side elements 6.

Figure 5:
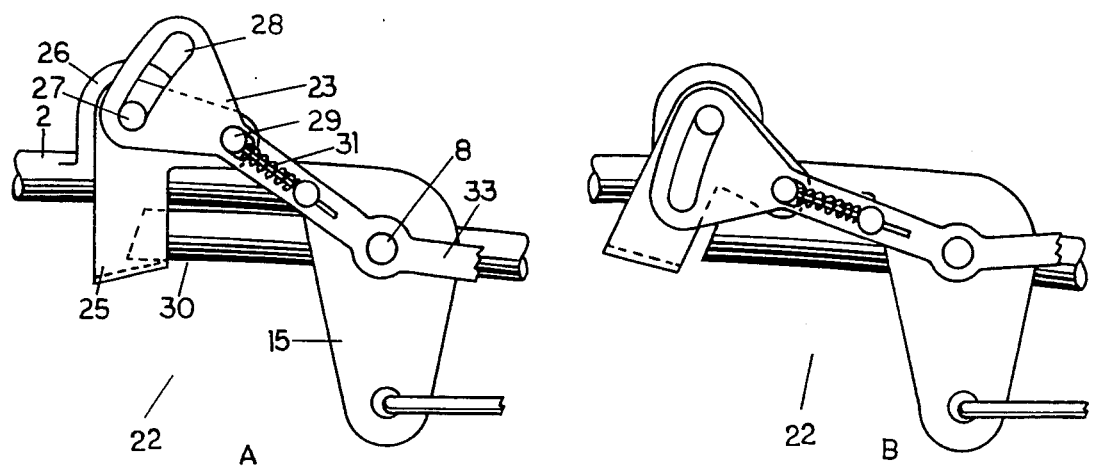
FIG. 5 is an enlarged detailed side elevational view of the arresting mechanism in its "locked" (a) and "unlocked" (b) position.

When operated on a flat surface, the pivotal movement of the rear legs 4 is checked by arresting mechanisms generally designated 22 and located on the rear portion of each side member 2; such a mechanism is shown in detail on FIG. 5.

An arresting mechanism 22 comprises a rocker 23 positioned on pivot 8 and a latch 25 pivotably positioned on lip 26, said lip is welded or otherwise fixed to the rear end of side member 2. Pivot 27 inserts through slot 28 of rocker 23 and thus limits the rotary movement of said rocker. Pin 29 of latch 25 is constantly engaged with rocker 23, so that when rocker 23 is in its upper position ("A" in FIG. 5) latch 25 is engaged with loose end 30 of rear leg 4 and thus prevents it from its pivotal downward movement and makes rear leg 4 immovable in relation to the carriage. In its lower position ("B" in FIG. 5) rocker 23 disengages latch 25 from the loose portion 30 of rear leg 4 and said leg is free to pivot.

Pressure spring 31 is engaged with rocker 23 and latch 25 and secures rocker 23 in either position, thus preventing latch 25 from an incidental engagement.

Figure 6:
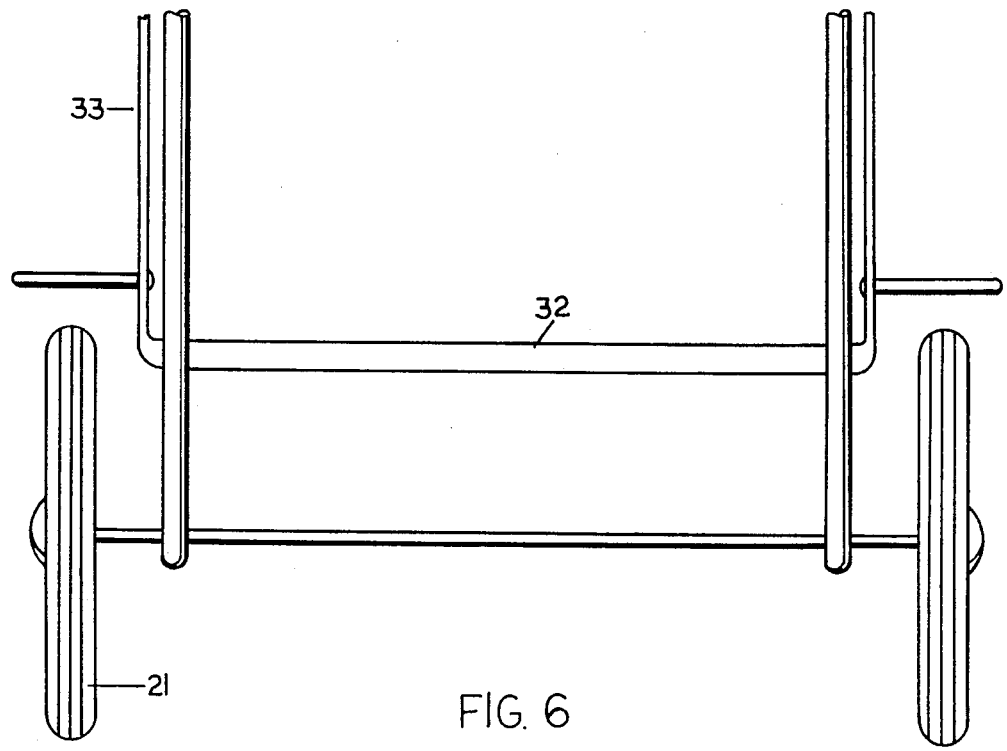
FIG. 6 is an enlarged, rear elevational view of the arresting pedal and rear legs carrying wheels.

Arresting mechanisms 22 are controlled by the operator through the means of an arresting pedal 32 (FIGS. 1 and 6) connected with each rocker 23 by a connecting rod 33. Pushed backward or forward, pedal 32 by means of said connecting rod moves rocker 23 into its lower or upper position respectively, thus disengaging or engaging latch 25, and, correspondingly, releasing or arresting rear leg 4.

Return mechanism 34 includes a return spring enclosed in a tube and provided with a dampering piston of a usual type (not shown).

Figure 7:
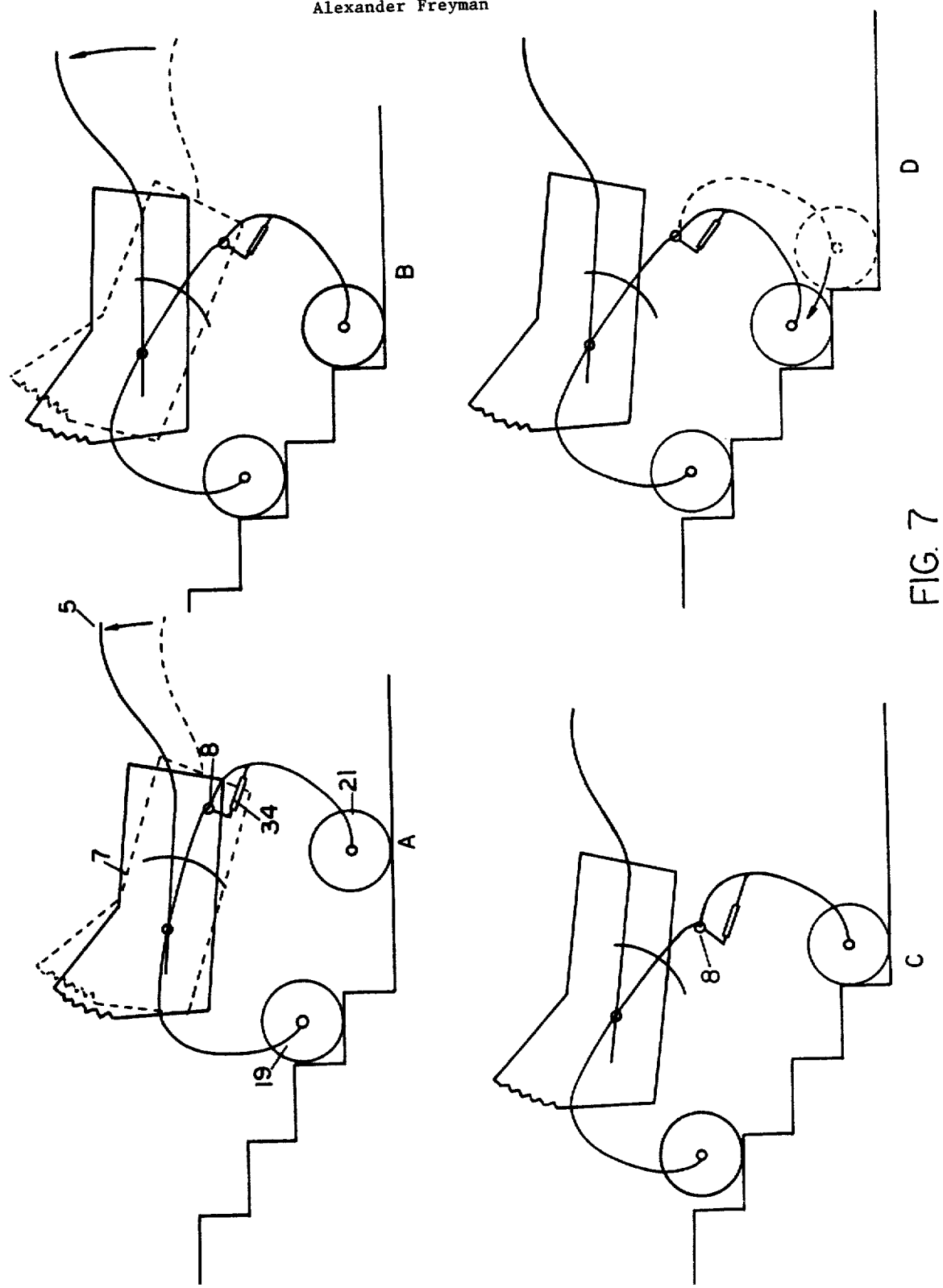
FIG. 7 is a set of kinematic diagrams showing the process of climbing stairs.

While approaching a staircase the operator pushes the arresting pedal 32 backward, thus disengaging arresting mechanism 22. Now rear legs 4 are free to pivot and the carriage is ready for climbing stairs, which process is illustrated by diagrams in FIG. 7.

A. The operator, slightly leaning the carriage backward, puts front wheels 19 onto the first step of the staircase (dotted lines); depressing controlling bar 18 (shown in (FIG. 4) the operator releases basket 7 and pushes the handle 5 upward tilts said basket forward (solid lines) so that the tilt of the basket should compensate the slant of the staircase.

B. The operator releases controlling bar 18, thus locking the basket, leans the carriage further backward and puts front wheels 19 onto the second step of the staircase (dotted lines), after which the position of the basket should be corrected as was shown on step "A", if necessary (solid lines).

C. The operator pushes the handle 5 downward and then forward, overcoming the resistance of the return mechanism 34 and moves the carriage further up, till front wheels 19 are put onto the third step of the staircase, rear wheels resting against the vertical wall of the first step and rear legs pivoting around 8.

D. The operator through the means of handle 5 lifts the rear end of the carriage so that rear wheels 21 are level with the first step, and return mechanism 34 puts said rear wheels onto the first step.

Steps 3 and 4 of the above procedure are repeated until the carriage reaches the last step of the staircase. Here the operator puts the basket in a horizontal position the way it has been described, arrests it, and pushing the arresting pedal 32 forward (FIG. 1) locks the rear legs 4, and the carriage now obtains a sturdy, stable structure and is ready for further movement on a flat surface.

The process of going downstairs is quite similar to that has been described, the only difference is that the basket should be tilted backward and not forward.

While specific embodiments of the invention have been described, it will be understood that many minor changes and modifications can be made without departing from the scope of the invention.

What is claimed is:

1. A baby carriage comprising:
   (a) a frame, including two spaced apart side members, a pair of front legs carrying wheels, said front legs are integral with said side members, and a pair of rear legs carrying wheels, said rear legs are pivotally attached to said side members, whereby said baby carriage is capable of ascending and descending stairs;
   (b) a pair of return springs connected between said frame and said rear legs;
   (c) a basket, having a front end and a rear end, said basket is positioned between said side members, its front end pivoted thereon;
   (d) a U-shaped handle fixedly attached to said basket, whereby said carriage can be propelled and said basket can be tilted relative to said frame; and
   (e) a tilting mechanism which includes a supporting plate having a plurality of external slots, and a locking member engageable with one of said plurality of external slots, whereby said basket can be secured at a desired angle relative to said frame, and a supporting means integral with said locking member, whereupon the rear end of said basket rests.

2. A baby carriage, according to claim 1, with the addition of a controlling means incorporated in said handle, and connected with said locking member.

3. A baby carriage, according to claim 1, with the addition of a manually operable arresting mechanism, positioned on the rear portion of said frame, whereby the pivotal movement of said rear legs can be arrested.

* * * * *

UNITED STATES PATENT AND TRADEMARK OFFICE

CERTIFICATE OF CORRECTION

Page 1 of 2

Patent No.    : 4,770,429

Dated         : Sept. 13, 1988

Inventor(s)   : Alexander Freyman

It is certified that error appears in the above-identified patent and that said Letters Patent are hereby corrected as shown below:

Add sheet 4 to the set of drawings.

Signed and Sealed this

Thirty-first Day of January, 1989

Attest:

DONALD J. QUIGG

*Attesting Officer*    *Commissioner of Patents and Trademarks*